US010866386B2

(12) United States Patent
Chino et al.

(10) Patent No.: US 10,866,386 B2
(45) Date of Patent: Dec. 15, 2020

(54) LENS CONTROL APPARATUS AND METHOD FOR CONTROLLING THE SAME

(71) Applicant: CANON KABUSHIKI KAISHA, Tokyo (JP)

(72) Inventors: Shunsuke Chino, Wako (JP); Toshiyuki Dobashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 166 days.

(21) Appl. No.: 15/936,182

(22) Filed: Mar. 26, 2018

(65) Prior Publication Data
US 2018/0284390 A1    Oct. 4, 2018

(30) Foreign Application Priority Data

Mar. 28, 2017 (JP) ................................ 2017-063732

(51) Int. Cl.
| H04N 5/225 | (2006.01) |
| G02B 7/36 | (2006.01) |
| G02B 7/09 | (2006.01) |
| G03B 13/36 | (2006.01) |
| G02B 7/02 | (2006.01) |
| G03B 3/10 | (2006.01) |

(52) U.S. Cl.
CPC ............. *G02B 7/36* (2013.01); *G02B 7/028* (2013.01); *G02B 7/09* (2013.01); *G03B 3/10* (2013.01); *G03B 13/36* (2013.01)

(58) Field of Classification Search
CPC .................................................. H04N 5/2254
USPC ........................................................ 348/345
See application file for complete search history.

(56) References Cited

U.S. PATENT DOCUMENTS

| 5,640,225 A | 6/1997 | Nakata |
| 9,389,392 B2 | 7/2016 | Morimoto |
| 2009/0230911 A1* | 9/2009 | Kikuchi ................. G05B 5/01 318/603 |

FOREIGN PATENT DOCUMENTS

| EP | 2431780 A1 | 3/2012 |
| JP | 2003232986 A | 8/2003 |
| WO | 2016158040 A1 | 10/2016 |

* cited by examiner

*Primary Examiner* — Joel W Fosselman
(74) *Attorney, Agent, or Firm* — Canon U.S.A., Inc. IP Division (57) ABSTRACT

A lens control apparatus having an imaging optical system including a focus lens includes a lens control unit configured to control a position of a lens of the imaging optical system based on a control driving amount of the lens, an acquisition unit configured to acquire driving information including an actual driving amount of the lens controlled by the lens control unit, and a first correction unit configured to correct the position of the lens based on a difference between the control driving amount and the actual driving amount. The first correction unit corrects the position of the lens by adding or subtracting an amount of correction to or from the control driving amount when the lens control unit next performs the control of the position of the lens, such that the difference decreases.

23 Claims, 7 Drawing Sheets

| SPECIFIED DRIVING AMOUNT | ACTUAL DRIVING AMOUNT | | | |
|---|---|---|---|---|
| | LENS A | | LENS B | |
| | UPWARD | DOWNWARD | UPWARD | DOWNWARD |
| 1 | 1 | 0 | 1 | 2 |
| 2 | 2 | 1 | 1 | 3 |
| 3 | 3 | 2 | 2 | 3 |
| 4 | 4 | 4 | 2 | 4 |
| 5 | 5 | 4 | 3 | 4 |
| 6 | 6 | 6 | 5 | 6 |
| 7 | 7 | 6 | 6 | 7 |
| 8 | 8 | 8 | 8 | 7 |
| 9 | 9 | 8 | 9 | 8 |
| 10 | 10 | 10 | 9 | 8 |

[PULSE COUNT VALUE OR ENCODER VALUE]

LENS CONTROL APPARATUS AND METHOD FOR CONTROLLING THE SAME

BACKGROUND OF THE INVENTION

Field of the Invention

The present invention relates to a lens control apparatus and a method for controlling the same, and relates to control of a lens for driving the lens by specifying the driving amount of the lens.

Description of the Related Art

Some lens control apparatuses perform autofocus (hereinafter "AF") control for controlling a focus lens to be at the position where an imaging optical system is focused on an object. For a monitoring camera, there is a case where focus is adjusted by AF or a manual operation by a user, and then, the focus is fixed and used without a change. However, even if the focus is fixed as described above, the position of a focus lens may change by, for example, the expansion or contraction of an imaging optical system or an apparatus itself due to a change in the temperature, and a blur (a shift in the focus) may occur.

Further, even if an attempt is made to drive a lens by a predetermined driving amount, there is a case where the lens does not move by an indicated predetermined amount due to a mechanical deformation or an orientation, and an operation cannot be performed to move the lens to the intended position of the lens.

The publication of Japanese Patent Application Laid-Open No. 2003-232986 discusses an image capturing apparatus that, to correct the difference between the amount of actuation of a driving source and the amount of movement of a lens unit due to the deformation of a power transmission mechanism, stores correction information corresponding to the amount of deformation of the power transmission mechanism. The image capturing apparatus in the publication of Japanese Patent Application Laid-Open No. 2003-232986 calculates lens movement information indicating the amount of movement or the moving speed of the lens unit based on the stored correction information.

However, in the image capturing apparatus discussed in the publication of Japanese Patent Application Laid-Open No. 2003-232986, the correction information corresponding to the amount of deformation may not be correctly calculated due to individual differences. Further, in the case of an interchangeable lens, it may be necessary to acquire correction information with respect to each lens, and it may take time to transfer data. Further, some lens may not have correction information, and the correction itself cannot be made.

SUMMARY OF THE INVENTION

The present invention is directed to providing a lens control unit capable of capturing an image at the intended position of a lens by correcting the difference between an indicated driving amount and an actual driving amount of the lens.

According to an aspect of the present invention, a lens control apparatus having an imaging optical system including a focus lens includes a lens control unit configured to control a position of a lens of the imaging optical system based on a control driving amount of the lens, an acquisition unit configured to acquire driving information including an actual driving amount of the lens controlled by the lens control unit, and a first correction unit configured to correct the position of the lens based on a difference between the control driving amount and the actual driving amount. The first correction unit corrects the position of the lens by adding or subtracting an amount of correction to or from the control driving amount when the lens control unit next performs the control of the position of the lens, such that the difference decreases.

Further features of the present invention will become apparent from the following description of exemplary embodiments with reference to the attached drawings.

DESCRIPTION OF THE EMBODIMENTS

Exemplary embodiments of the present invention will be described in detail below based on the accompanying drawings. Each of the embodiments of the present invention described below can be implemented solely or as a combination of a plurality of the embodiments or features thereof where necessary or where the combination of elements or features from individual embodiments in a single embodiment is beneficial.

Figure 1:
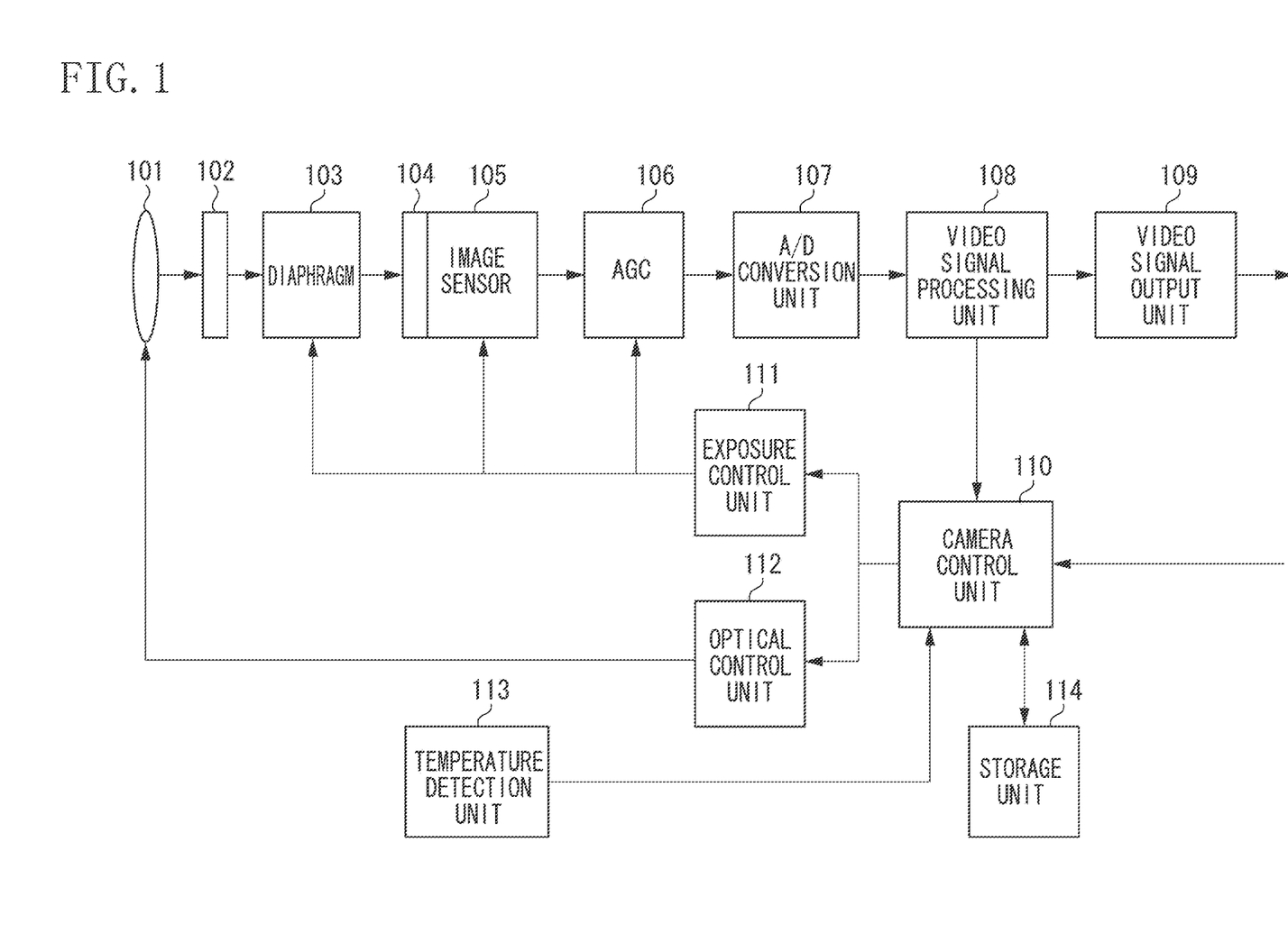
FIG. 1 is a block diagram illustrating an example of a configuration of an image capturing apparatus according to an exemplary embodiment of the present invention.

A first exemplary embodiment of the present invention will be described below in detail. FIG. 1 is a block diagram illustrating an example of the configuration of an image capturing apparatus (a lens control apparatus) according to the exemplary embodiment. In the present exemplary embodiment, the lens control apparatus is described taking as an example an image capturing apparatus integrated with lenses. Alternatively, the lenses may be configured such that an interchangeable lens is attachable to and detachable from the image capturing apparatus. Further, although a monitoring camera is assumed in the present exemplary embodiment, the present exemplary embodiment is also applicable to a camera other than the monitoring camera.

A lens group 101 is an optical system for collecting light incident from an object on an image sensor 105. The lens group 101 includes a focus lens for bringing the object into focus, and a zoom lens (a variable magnification lens) for adjusting the angle of view. The light entering the camera through the lens group 101 passes through an optical filter 102.

As the optical filter 102, for example, an infrared cut-off filter (hereinafter referred to as an "IRCF") or a band-pass filter (hereinafter referred to as a "BPF") is included. The IRCF or the BPF can advance and retreat to and from the optical path of the imaging optical system (the lens group 101).

A diaphragm 103 adjusts the amount of light to be incident on the image sensor 105.

Then, video information (object information) is obtained by adjusting the amount of light passing through a color filter 104, in which colors are arranged in a predetermined order for each pixel of a light-receiving surface of the image sensor 105, and an object image is formed on the image sensor 105. The image sensor 105 outputs captured image information about an image capturing target as an analog signal.

Automatic gain control (AGC) 106 controls the gain of a video (an object image) formed on the image sensor 105, thereby adjusting the luminance of a video signal.

An analog-to-digital (A/D) conversion unit 107 converts the analog signal of which the image is formed on the image sensor 105 and of which the gain is adjusted by the AGC 106, into a digital signal.

A video signal processing unit 108 performs predetermined processing on the digital signal from the A/D conversion unit 107 and outputs a luminance signal and a color signal with respect to each pixel. The video signal processing unit 108 generates a video to be output and also generates parameters for controlling the camera. Examples of the parameters for controlling the camera include parameters for use in controlling the exposure, such as an aperture, parameters for use in controlling focusing, and parameters for use in performing white balance control for adjusting the tint.

A video signal output unit 109 outputs the video signal created by the video signal processing unit 108 to an external apparatus (not illustrated) via a network (not illustrated).

A camera control unit 110 controls the camera based on the camera control parameters obtained from the video signal processing unit 108. Further, based on a camera control signal input from the external apparatus (not illustrated) via the network (not illustrated), the camera control unit 110 controls the camera. For example, the external apparatus can receive and display the video signal. Additionally, a user operation is input to the external apparatus, whereby the external apparatus can transmit a command based on the operation to the image capturing apparatus.

The camera control unit 110 is connected to an exposure control unit 111, an optical control unit 112, and a storage unit 114 via a communication bus and can communicate information and a command to these units.

The exposure control unit 111 calculates luminance information in an image capturing screen from the luminance signal output from the video signal processing unit 108 and controls the diaphragm 103 and the AGC 106 to adjust the brightness of the captured image to a desired brightness. Further, the exposure control unit 111 can also adjust the shutter speed to adjust the storage time of the image sensor 105, thereby adjusting the brightness of the captured image.

Here, in focus control, which is a focusing operation, a high-frequency component is extracted from the video signal created by the video signal processing unit 108, and the value of the high-frequency component is used as focus information (an AF (autofocus) evaluation value). The present exemplary embodiment is described using an example where focus detection is performed with a contrast detection method. The configuration of the present invention, however, is not limited to this. Alternatively, the configuration may be such that focus detection is performed by a phase difference detection method. Then, the camera control unit 110 sets the position of the focus lens to maximize the AF evaluation value, and the optical control unit 112 controls the lens group 101.

A user can perform through the external apparatus a zoom or focus operation on the lens group 101 of the image capturing apparatus. In response to an instruction from the camera control unit 110, the optical control unit 112 drives the zoom lens and the focus lens of the lens group 101, thereby controlling the angle of view of the object to be captured, and the object distance at which the object is to be brought into focus.

A temperature detection unit 113 is a sensor for detecting the temperature inside the image capturing apparatus and transmits the temperature data to the camera control unit 110. A plurality of sensors may detect the temperature of the camera. For example, sensors may be placed near the front end of a lens barrel and near the image sensor 105. In this case, an appropriate temperature may be calculated based on temperatures detected by both sensors, or either one of these temperatures may be selected. The camera control unit 110 acquires information about the temperature via the temperature detection unit 113 at predetermined time intervals and monitors changes in the temperature. As the temperature detection unit 113, for example, a temperature sensor, such as a thermistor, is used. Further, the temperature detected by the temperature detection unit 113 can be stored in the storage unit 114.

Then, based on the temperature data, the camera control unit 110 calculates the amount of correction for a shift in the focus position due to the temperature, thereby correcting the focus. Since an image capturing apparatus integrated with lenses is assumed in the present exemplary embodiment, the camera control unit 110 may acquire correction parameters described below from the storage unit 114, which is a non-volatile memory, and calculate the amount of correction.

The storage unit 114 stores various image processing parameters, correction parameters described below, and temperature information detected by the temperature detection unit 113.

With reference to FIGS. 2 to 7, a detailed description will be provided of a specific example of processing to be performed in a case where the amount of focus correction changes due to the tendency of a change in the temperature.

Figure 2:
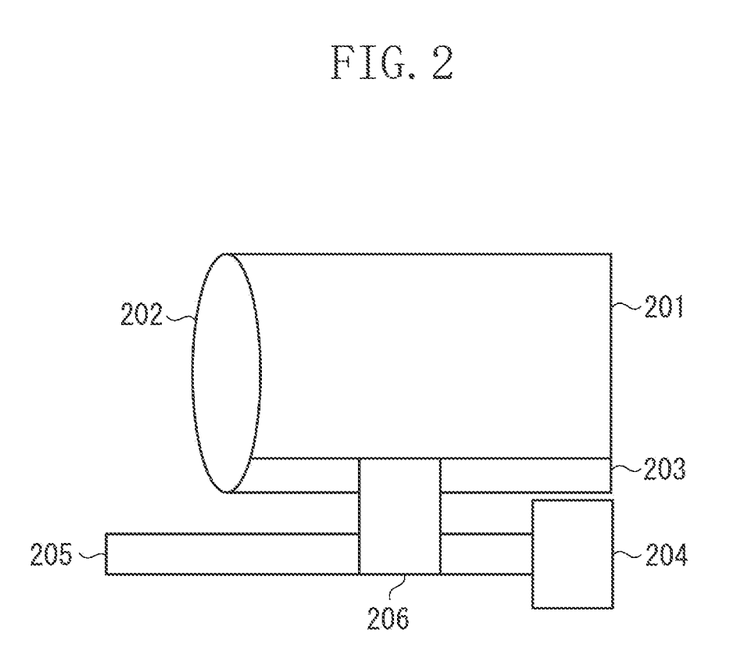
FIG. 2 is a diagram illustrating an example of a configuration of a lens according to the exemplary embodiment of the present invention.

FIG. 2 is a block diagram illustrating an example of the configuration of a lens according to the exemplary embodiment of the present invention and illustrates a schematic diagram of a general lens barrel. In FIG. 2, a lens barrel 201 includes a lens 202.

The lens 202 has the following mechanism. The lens 202 is held by a slide bar 203 through engagement between a screw 205 and a rack 206 and moves back and forth in the direction of the optical axis by the power of a lens driving motor 204. The engagement between the screw 205 and the rack 206 has a mechanical tolerance. The tolerance brings about a shift in the position of a focus lens as mechanical looseness and influences the control of the focusing of the camera.

Furthermore, in some lens, every time the lens is driven, an error occurs in a pulse count value of a driving system, such as the lens driving motor 204, or an encoder value (not illustrated) for detecting the position of the lens. Examples of the error include an error due to the mechanical shape of the lens, an error due to the driving of the lens driving motor 204, and an error that occurs when a pulse count value of a lens control system is calculated.

Figure 3:
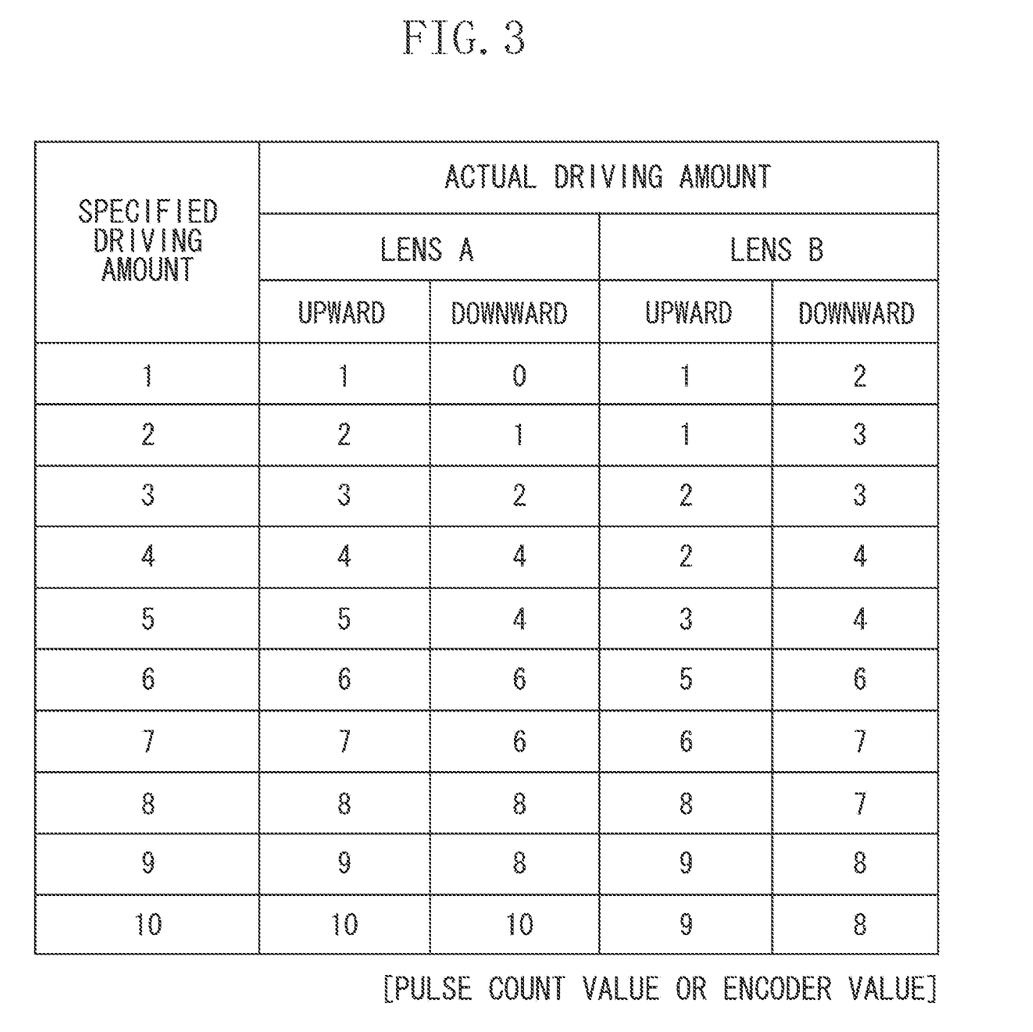
FIG. 3 is a diagram illustrating an example of a relationship between a specified driving amount and an actual driving amount according to the exemplary embodiment of the present invention.

FIG. 3 is a diagram illustrating an example of the relationship between a specified driving amount and an actual driving amount according to the exemplary embodiment of the present invention. In FIG. 3, for each driving amount described in the column "specified driving amount", an example of an "actual driving amount" with respect to each lens type and each image capturing direction is illustrated in a horizontal direction. For example, even if an attempt is made to drive a lens by a predetermined driving amount as in FIG. 3 (a specified driving amount), the lens may not be driven by the predetermined amount due to the driving characteristics, such as the hysteresis, the orientation, and the speed, of the lens (an actual driving amount). As a result, if the lens is repeatedly driven, the pulse count value of the driving system or the encoder value deviates.

Figure 4:
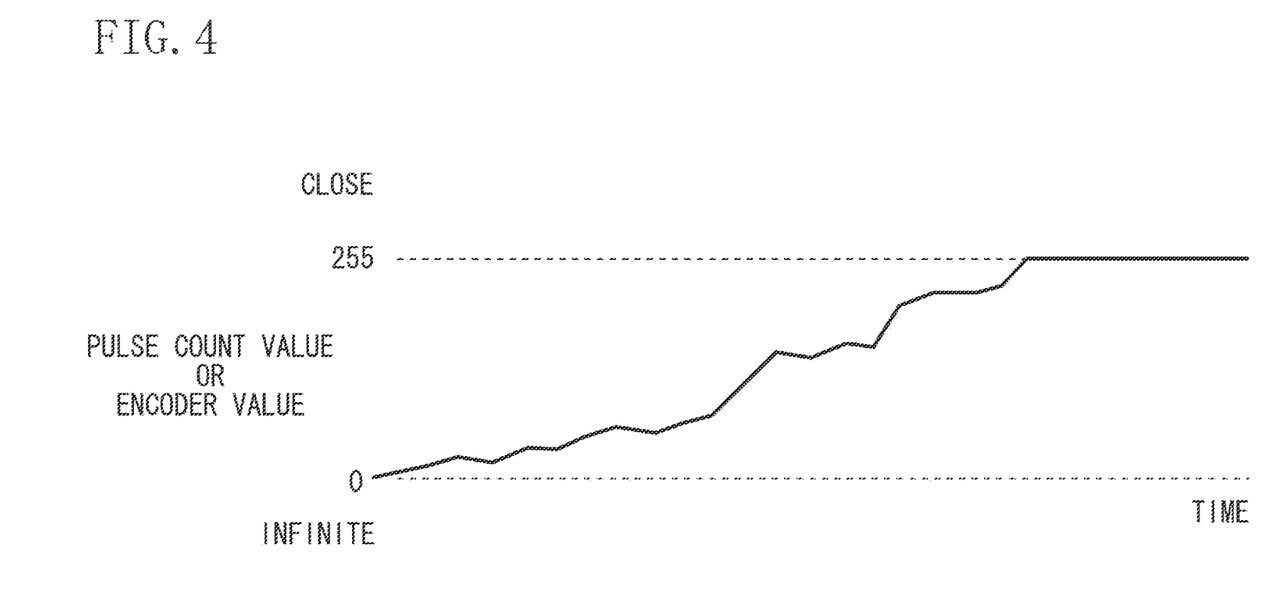
FIG. 4 is a diagram illustrating an example of a pulse count value or an encoder value obtained by repeatedly driving a lens according to the exemplary embodiment of the present invention.

FIG. 4 illustrates an example of the pulse count value or the encoder value obtained by the lens, according to the exemplary embodiment of the present invention, being repeatedly driven. FIG. 4 illustrates the pulse count value or the encoder value in a case where the focus position (the lens position) is the same. As time elapses, the pulse count value or the encoder value deviates. Thus, it is necessary to correct the pulse count value or the encoder value according to the deviation so that the lens correctly moves by a driving amount specified for correction due to the temperature.

Figure 5:
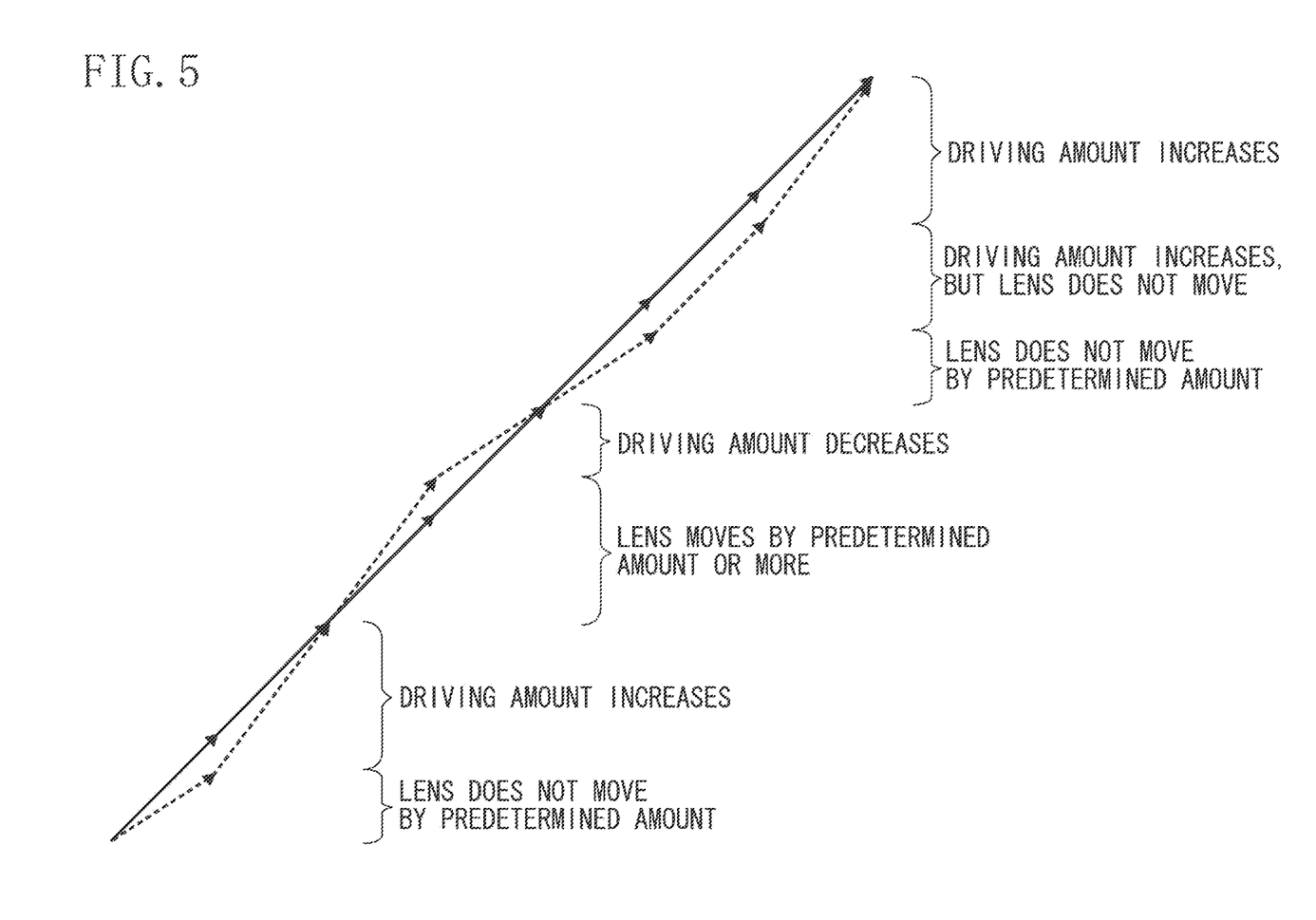
FIG. 5 is a diagram illustrating an example of a correction operation according to the exemplary embodiment of the present invention.

FIG. 5 is a diagram illustrating an example of a correction operation according to the exemplary embodiment of the present invention. In the example of the correction operation illustrated in FIG. 5, with respect to a specified driving amount, the excess (+) or the insufficiency (−) of the amount by which the lens is actually driven is stored, and the lens is controlled through addition or subtraction to cancel out the difference between these driving amounts when the lens is driven next. As a result, in terms of the total of the previous difference and the current difference, it is possible to reduce the difference between the specified driving amount and the actual driving amount. In the present exemplary embodiment, the pulse count value or the encoder value is used. Alternatively, in the case of an interchangeable lens, a parameter returned from the lens may be used. Further, the configuration may be such that the correction is not made to equalize the pulse count value or the encoder value, but a focus evaluation value, which is a value indicating the degree of focusing for use in adjusting the focus position in AF control, may be corrected. The use of the evaluation value enables the acquisition of the correlation between focus positions even if the pulse count value or the encoder value deviates.

Figure 6:
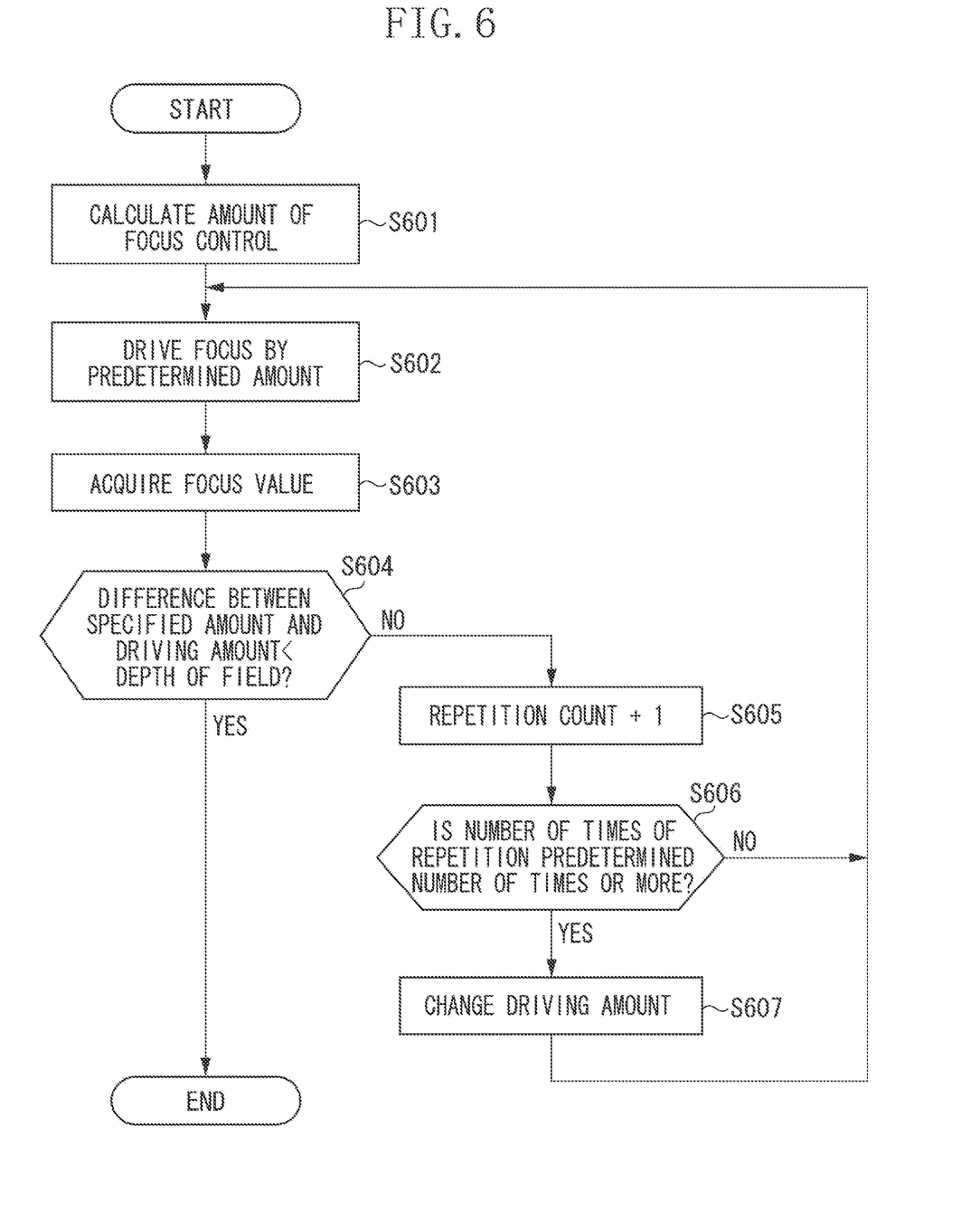
FIG. 6 is a flowchart of a lens position correction process according to the exemplary embodiment of the present invention.

With reference to FIG. 6, a description will be provided of the flow of a correction process for correcting a driving amount. FIG. 6 is a flowchart of a lens position correction process according to the exemplary embodiment of the present invention. In the flowchart in FIG. 6, an example is described where the camera control unit 110, which is a computer, executes this process according to a correction control program as a computer program. The present invention, however, is not limited to this. Alternatively, the configuration may be such that a control unit (not illustrated) controls and executes processing blocks. In this case, the configuration is implemented by the program stored in a memory (a read-only memory (ROM)) included in the control unit being loaded into a memory (a random-access memory (RAM)), and by a central processing unit (CPU) executing the program.

First, in step S601, the camera control unit 110 calculates the lens driving amount required to correct a shift in the position of the lens due to AF control or a change in the temperature.

Next, in step S602, based on the driving amount of the lens calculated in step S601, the camera control unit 110 controls the lens group 101 via the optical control unit 112.

In step S603, the optical control unit 112 acquires the driving amount by which the lens group 101 has been actually driven. For example, it is possible to calculate the driving amount from lens position information before and after the lens group 101 is driven. In the present exemplary embodiment, as described above, for example, the optical control unit 112 acquires the lens position information from the pulse count value or the encoder value after the lens group 101 is driven, or a parameter returned from an interchangeable lens and regarding the position of the lens, and calculates the actual driving amount. Alternatively, the configuration can also be such that, for example, the optical control unit 112 calculates actual lens position information from an evaluation value for focus control.

In step S604, the camera control unit 110 calculates a depth of field from the difference between a control driving amount and the actual driving amount, and determines whether a control position and an actual position are in the depth of field. If the specified position and the actual position are in the depth of field (Yes in step S604), the series of processes ends. If the specified position and the actual position are not in the depth of field (No in step S604), the processing proceeds to step S605. At this time, it is determined whether the specified position and the actual position are in the depth of field. Alternatively, the position of the lens group 101 may be determined based on a change in a focus evaluation value (a contrast evaluation value), which indicates the degree of focusing for use in adjusting the focus in AF control. Further, the configuration may be such that the lens group 101 continues to be controlled until the lens group 101 is driven by the specified driving amount.

In step S605, the camera control unit 110 increments a repetition count.

Next, in step S606, the camera control unit 110 determines whether the number of times of repetition is a predetermined number of times or more. Although the predetermined number of times may be constant, the predetermined number of times may be calculated based on the probability that each lens does not correctly move according to the driving characteristics of the lens. If the number of times of repetition is less than the predetermined number of times (No in step S606), the processing returns to step S602. In step S602, the camera control unit 110 performs the driving process again. If the number of times of repetition is the predetermined number of times or more (Yes in step S606), it is determined that if the current driving amount is maintained, the lens may not be able to continue to move. Then, the processing proceeds to step S607.

In step S607, the camera control unit 110 changes the driving amount and drives the lens group 101 again. At this time, there is a possibility that some lens changes by not only the driving amount but also the speed or the exciting voltage of the lens. Thus, the camera control unit 110 may change at least one of the driving amount, the driving speed, and the exciting voltage.

Figure 7:
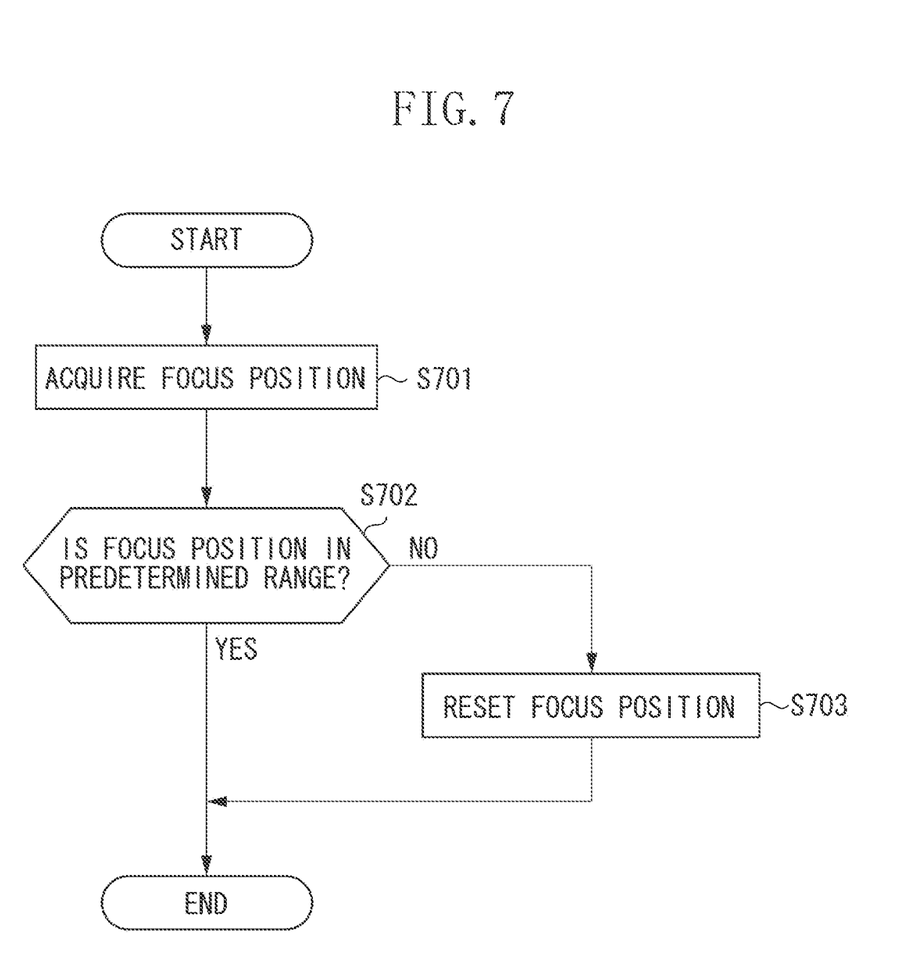
FIG. 7 is a flowchart of a reset process for resetting the pulse count value or the encoder value according to the exemplary embodiment of the present invention.

Next, with reference to FIG. 7, a detailed description will be provided of the operation of clearing the pulse count value or the encoder value. If the pulse count value or the encoder value continues to deviate through repeated operations, the count value or the encoder value may also overflow as in FIG. 4 because the count value and the encoder value are represented by 8 bits or 16 bits for control and therefore finite. In the case of 8 bits, if an overflow occurs, and even if the lens is driven in the direction in which the count value of the driving system or the encoder value increases, the count value or the encoder value may be fixed at 255. In this case, there is a possibility that the count value or the encoder value becomes saturated at 255, and the lens cannot be driven any further to the close-range side and therefore cannot be correctly controlled. Thus, the count value or the encoder value is reset every time the lens is driven or if the count value or the encoder value deviates by a predetermined amount. Then, the lens is driven taking into account the fact that the reset count value or encoder value becomes a reference value, whereby it is possible to continue to use the lens for a long time. To detect that the count value or the encoder value deviates by the predetermined amount, an evaluation value for use in adjusting the focus position in AF control may be used. Then, in a case where the evaluation value deviates by a predetermined value or more, the count value or the encoder value may be reset.

FIG. 7 illustrates a processing flow. FIG. 7 is a flowchart of a reset process for resetting the pulse count value or the encoder value according to the exemplary embodiment of the present invention. As the processing, an example is described where the camera control unit 110 executes this process according to the correction control program as a computer program. The present invention, however, is not limited to this. Alternatively, the configuration may be such that a control unit (not illustrated) controls and executes processing blocks. In this case, the configuration is implemented by the program stored in a memory (a ROM) included in the control unit being loaded into a memory (a RAM), and by a CPU executing the program.

In step S701, the camera control unit 110 acquires position information about the focus lens based on the pulse count value or the encoder value.

Next, in step S702, the camera control unit 110 compares the acquired lens position information about the focus lens and a predetermined range, thereby determining whether the lens position information is in the predetermined range. If the lens position information is represented by 8 bits as in FIG. 4, the camera control unit 110 determines whether the lens position information is in the range of 64 to 192. If the lens position information is in the predetermined range (Yes in step S702), the processing ends. If the lens position information is outside the predetermined range (No in step S702), the processing proceeds to step S703.

In step S703, the camera control unit 110 resets the focus position, i.e., sets a value at which the pulse count value or the encoder value is not saturated, such as 128. If the reset operation is performed, a shift in the lens position due to AF control or a change in the temperature is corrected using the reset value as a reference.

In this determination, it is determined whether the focus position is in the predetermined range. Alternatively, the configuration may be such that a determination is made by measuring the number of times the focus lens is driven or the driving time of the focus lens. Furthermore, the number of bits can also be changed by a hardware or software configuration.

While exemplary embodiments of the present invention have been described, the present invention is not limited to these exemplary embodiments, but can be modified and changed in various manners within the scope of the present invention. In the scope of the technical idea of the present invention, the present invention is not limited to the above exemplary embodiments, but should be adapted to the above exemplary embodiments by changing the embodiments of the present invention where appropriate, depending on the target circuit form. For example, the image capturing apparatus according to the above exemplary embodiment can be applied to a digital still camera and a digital video camera.

The present invention can also be realized by the process of supplying a program for achieving one or more functions of the above exemplary embodiments to a system or an apparatus via a network or a storage medium, and of causing one or more processors of a computer of the system or the apparatus to read and execute the program. Further, the present invention can also be achieved by a circuit (e.g., an application-specific integrated circuit (ASIC)) for achieving the one or more functions.

According to the present invention, it is possible to capture an image at the intended position of a lens through correction of the difference between an indicated driving amount and an actual driving amount of the lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-063732, filed Mar. 28, 2017, which is hereby incorporated by reference herein in its entirety.

What is claimed is:

1. A lens control apparatus including an imaging optical system including a focus lens, the lens control apparatus comprising:
   a lens control unit configured to control a position of a lens of the imaging optical system based on a control driving amount;
   an acquisition unit configured to acquire driving information including an actual driving amount of the lens controlled by the lens control unit;
   a first correction unit configured to correct the position of the lens based on a difference between the control driving amount and the actual driving amount,
   wherein the first correction unit corrects the position of the lens by adding an amount of correction to, or subtracting an amount of correction from, the control driving amount when the lens control unit next performs the control of the position of the lens, such that the difference decreases; and
   a calculation unit configured to calculate a focus evaluation value indicating a degree of focusing,
   wherein the driving information acquired by the acquisition unit includes the focus evaluation value, and
   wherein the first correction unit corrects the position of the lens using the focus evaluation value.

2. The lens control apparatus according to claim 1, wherein the imaging optical system is an interchangeable lens imaging optical system.

3. The lens control apparatus according to claim 1,
   wherein the imaging optical system is an interchangeable lens imaging optical system, and
   wherein the acquisition unit acquires lens position information from the interchangeable lens imaging optical system.

4. A lens control apparatus including an imaging optical system including a focus lens, the lens control apparatus comprising:
- a lens control unit configured to control a position of a lens of the imaging optical system based on a control driving amount;
- an acquisition unit configured to acquire driving information including an actual driving amount of the lens controlled by the lens control unit;
- a first correction unit configured to correct the position of the lens based on a difference between the control driving amount and the actual driving amount,
- wherein the first correction unit corrects the position of the lens by adding an amount of correction to, or subtracting an amount of correction from, the control driving amount when the lens control unit next performs the control of the position of the lens, such that the difference decreases; and
- a calculation unit configured to calculate a focus evaluation value indicating a degree of focusing,
- wherein in a case where the focus evaluation value is a predetermined value or more, the first correction unit does not correct the position of the lens regardless of the difference between the control driving amount and the actual driving amount.

5. A lens control apparatus including an imaging optical system including a focus lens, the lens control apparatus comprising:
- a lens control unit configured to control a position of a lens of the imaging optical system based on a control driving amount;
- an acquisition unit configured to acquire driving information including an actual driving amount of the lens controlled by the lens control unit;
- a first correction unit configured to correct the position of the lens based on a difference between the control driving amount and the actual driving amount,
- wherein the first correction unit corrects the position of the lens by adding an amount of correction to, or subtracting an amount of correction from, the control driving amount when the lens control unit next performs the control of the position of the lens, such that the difference decreases; and
- a depth-of-field calculation unit configured to calculate a depth of field corresponding to the position of the lens of the imaging optical system,
- wherein in a case where the difference between the control driving amount and the actual driving amount is in the depth of field calculated by the depth-of-field calculation unit, the first correction unit does not correct the position of the lens.

6. A lens control apparatus including an imaging optical system including a focus lens, the lens control apparatus comprising:
- a lens control unit configured to control a position of a lens of the imaging optical system based on a control driving amount;
- an acquisition unit configured to acquire driving information including an actual driving amount of the lens controlled by the lens control unit;
- a first correction unit configured to correct the position of the lens based on a difference between the control driving amount and the actual driving amount,
- wherein the first correction unit corrects the position of the lens by adding an amount of correction to, or subtracting an amount of correction from, the control driving amount when the lens control unit next performs the control of the position of the lens, such that the difference decreases;
- a count unit configured to count the number of times the first correction unit corrects the position of the lens; and
- a second correction unit configured to control, in a case where the number of times is a predetermined number of times or more, the lens by changing at least one of the control driving amount, a driving speed, and an exciting voltage, to correct the position of the lens.

7. A lens control apparatus including an imaging optical system including a focus lens, the lens control apparatus comprising:
- a lens control unit configured to control a position of a lens of the imaging optical system based on a control driving amount;
- an acquisition unit configured to acquire driving information including an actual driving amount of the lens controlled by the lens control unit;
- a first correction unit configured to correct the position of the lens based on a difference between the control driving amount and the actual driving amount,
- wherein the first correction unit corrects the position of the lens by adding an amount of correction to, or subtracting an amount of correction from, the control driving amount when the lens control unit next performs the control of the position of the lens, such that the difference decreases;
- a temperature detection unit configured to detect a temperature inside the imaging optical system or the lens control apparatus; and
- a third correction unit configured to correct the position of the lens of the imaging optical system according to the detected temperature,
- wherein in a case where the third correction unit corrects the position of the lens, the first correction unit corrects the position of the lens based on the difference between the control driving amount of the lens to be controlled by the third correction unit and the actual driving amount included in the driving information.

8. A lens control apparatus including an imaging optical system including a focus lens, the lens control apparatus comprising:
- a lens control unit configured to control a position of a lens of the imaging optical system based on a control driving amount;
- an acquisition unit configured to acquire driving information including an actual driving amount of the lens controlled by the lens control unit;
- a first correction unit configured to correct the position of the lens based on a difference between the control driving amount and the actual driving amount,
- wherein the first correction unit corrects the position of the lens by adding an amount of correction to, or subtracting an amount of correction from, the control driving amount when the lens control unit next performs the control of the position of the lens, such that the difference decreases;
- a reset unit configured to reset information indicating the position of the lens; and
- a count unit configured to measure the number of times the lens is driven or a driving time of the lens
- wherein in a case where the number of times the lens is driven is a predetermined number of times or more, or the driving time is a predetermined time or more, the reset unit executes the reset.

9. The lens control apparatus including an imaging optical system including a focus lens, the lens control apparatus comprising:
a lens control unit configured to control a position of a lens of the imaging optical system based on a control driving amount;
an acquisition unit configured to acquire driving information including an actual driving amount of the lens controlled by the lens control unit;
a first correction unit configured to correct the position of the lens based on a difference between the control driving amount and the actual driving amount,
wherein the first correction unit corrects the position of the lens by adding an amount of correction to, or subtracting an amount of correction from, the control driving amount when the lens control unit next performs the control of the position of the lens, such that the difference decreases;
a reset unit configured to reset information indicating the position of the lens; and
a calculation unit configured to calculate a focus evaluation value indicating a degree of focusing,
wherein in a case where the focus evaluation value changes by a predetermined amount or more, or in a case where the position of the lens is outside a predetermined range, the reset unit executes the reset.

10. A method for controlling a lens control apparatus including an imaging optical system including a focus lens, the method comprising:
controlling a position of a lens of the imaging optical system based on a control driving amount;
acquiring driving information indicating an actual driving amount of the lens controlled by the control;
correcting the position of the lens based on a difference between the control driving amount and the actual driving amount,
wherein the position of the lens is corrected by adding an amount of correction to, or subtracting an amount of correction from, the control driving amount when the position of the lens is next controlled, such that the difference decreases; and
calculating a focus evaluation value indicating a degree of focusing,
wherein the driving information acquired includes the focus evaluation value, and
wherein the position of the lens using the focus evaluation value is corrected.

11. A storage medium having stored therein a computer program that when executed on a computer causes the computer to perform the steps according to claim 10.

12. A method for controlling a lens control apparatus including an imaging optical system including a focus lens, the method comprising:
controlling a position of a lens of the imaging optical system based on a control driving amount;
acquiring driving information indicating an actual driving amount of the lens controlled by the control;
correcting the position of the lens based on a difference between the control driving amount and the actual driving amount,
wherein the position of the lens is corrected by adding an amount of correction to, or subtracting an amount of correction from, the control driving amount when the position of the lens is next controlled, such that the difference decreases; and
calculating a focus evaluation value indicating a degree of focusing,
wherein in a case where the focus evaluation value is a predetermined value or more, the position of the lens regardless of the difference between the control driving amount and the actual driving amount is not corrected.

13. A storage medium having stored therein a computer program that when executed on a computer causes the computer to perform the steps according to claim 12.

14. A method for controlling a lens control apparatus including an imaging optical system including a focus lens, the method comprising:
controlling a position of a lens of the imaging optical system based on a control driving amount;
acquiring driving information indicating an actual driving amount of the lens controlled by the control;
correcting the position of the lens based on a difference between the control driving amount and the actual driving amount,
wherein the position of the lens is corrected by adding an amount of correction to, or subtracting an amount of correction from, the control driving amount when the position of the lens is next controlled, such that the difference decreases; and
calculating a depth of field corresponding to the position of the lens of the imaging optical system,
wherein in a case where the difference between the control driving amount and the actual driving amount is in the depth of field calculated, the position of the lens is not corrected.

15. A storage medium having stored therein a computer program that when executed on a computer causes the computer to perform the steps according to claim 14.

16. A method for controlling a lens control apparatus including an imaging optical system including a focus lens, the method comprising:
controlling a position of a lens of the imaging optical system based on a control driving amount;
acquiring driving information indicating an actual driving amount of the lens controlled by the control;
correcting the position of the lens based on a difference between the control driving amount and the actual driving amount,
wherein the position of the lens is corrected by adding an amount of correction to, or subtracting an amount of correction from, the control driving amount when the position of the lens is next controlled, such that the difference decreases;
counting the number of times the position of the lens is corrected; and
controlling, in a case where the number of times is a predetermined number of times or more, the lens by changing at least one of the control driving amount, a driving speed, and an exciting voltage, to correct the position of the lens.

17. A storage medium having stored therein a computer program that when executed on a computer causes the computer to perform the steps according to claim 16.

18. A method for controlling a lens control apparatus including an imaging optical system including a focus lens, the method comprising:
controlling a position of a lens of the imaging optical system based on a control driving amount;
acquiring driving information indicating an actual driving amount of the lens controlled by the control;
correcting the position of the lens based on a difference between the control driving amount and the actual driving amount, wherein the position of the lens is corrected by adding an amount of correction to, or subtracting an amount of correction from, the control driving amount when the position of the lens is next controlled, such that the difference decreases;

detecting a temperature inside the imaging optical system or the lens control apparatus; and correcting the position of the lens of the imaging optical system according to the detected temperature, wherein in a case where the position of the lens is corrected, the position of the lens based on the difference between the control driving amount of the lens to be controlled and the actual driving amount included in the driving information is corrected.

19. A storage medium having stored therein a computer program that when executed on a computer causes the computer to perform the steps according to claim 18.

20. A method for controlling a lens control apparatus including an imaging optical system including a focus lens, the method comprising:

controlling a position of a lens of the imaging optical system based on a control driving amount;

acquiring driving information indicating an actual driving amount of the lens controlled by the control;

correcting the position of the lens based on a difference between the control driving amount and the actual driving amount, wherein the position of the lens is corrected by adding an amount of correction to, or subtracting an amount of correction from, the control driving amount when the position of the lens is next controlled, such that the difference decreases;

resetting information indicating the position of the lens; and measuring the number of times the lens is driven or a driving time of the lens wherein in a case where the number of times the lens is driven is a predetermined number of times or more, or the driving time is a predetermined time or more, the reset is executed.

21. A storage medium having stored therein a computer program that when executed on a computer causes the computer to perform the steps according to claim 20.

22. A method for controlling a lens control apparatus including an imaging optical system including a focus lens, the method comprising:

controlling a position of a lens of the imaging optical system based on a control driving amount;

acquiring driving information indicating an actual driving amount of the lens controlled by the control;

correcting the position of the lens based on a difference between the control driving amount and the actual driving amount, wherein the position of the lens is corrected by adding an amount of correction to, or subtracting an amount of correction from, the control driving amount when the position of the lens is next controlled, such that the difference decreases;

resetting information indicating the position of the lens; and calculating a focus evaluation value indicating a degree of focusing, wherein in a case where the focus evaluation value changes by a predetermined amount or more, or in a case where the position of the lens is outside a predetermined range, the reset is executed.

23. A storage medium having stored therein a computer program that when executed on a computer causes the computer to perform the steps according to claim 22.

* * * * *